SOUND RECORDING AND REPRODUCING APPARATUS

Filed Feb. 28, 1958 5 Sheets-Sheet 1

Sept. 6, 1960 J. DUBOIS 2,951,914

SOUND RECORDING AND REPRODUCING APPARATUS

Filed Feb. 28, 1958 5 Sheets-Sheet 2

SOUND RECORDING AND REPRODUCING APPARATUS

Sept. 6, 1960 J. DUBOIS 2,951,914

SOUND RECORDING AND REPRODUCING APPARATUS

Filed Feb. 28, 1958

5 Sheets-Sheet 5

United States Patent Office 2,951,914 Patented Sept. 6, 1960

2,951,914

SOUND RECORDING AND REPRODUCING APPARATUS

Jacques Dubois, Paris, France, assignor of one-half to Pierre Travers, Paris, France Filed Feb. 28, 1958, Ser. No. 718,332

Claims priority, application France Mar. 5, 1957

7 Claims. (Cl. 179—100.2)

This invention relates to a new article of manufacture, namely a sound recording and reproducing device, particularly adapted to be mounted on the dash board of an automobile, so as to permit the user to either make a sound recording on a clean tape and reproduce this recording if desired, or to reproduce the sound carried on a previously recorded tape.

Such a device is characterized by the fact that it comprises a chassis comprising on the one hand a box enclosing one or more recording and reproducing heads, an amplifier, and means for driving and guiding the clean or record carrying tape, and, on the other hand, a drawer which may be inserted and locked into or withdrawn from said box, this drawer being provided with means for locating and supporting the tape, means for regulating the winding and unwinding speeds of the tape, control means by which the machine is shifted between recording, reproducing, erasing, winding and unwinding positions, and finally, means for starting, for regulating the sound volume, and for stopping the machine.

In order that the invention may be more clearly understood, one embodiment thereof which is shown on the accompanying drawings will now be described, purely by way of illustration, without in any way limiting the invention to the structural details thereof.

Figure 1:
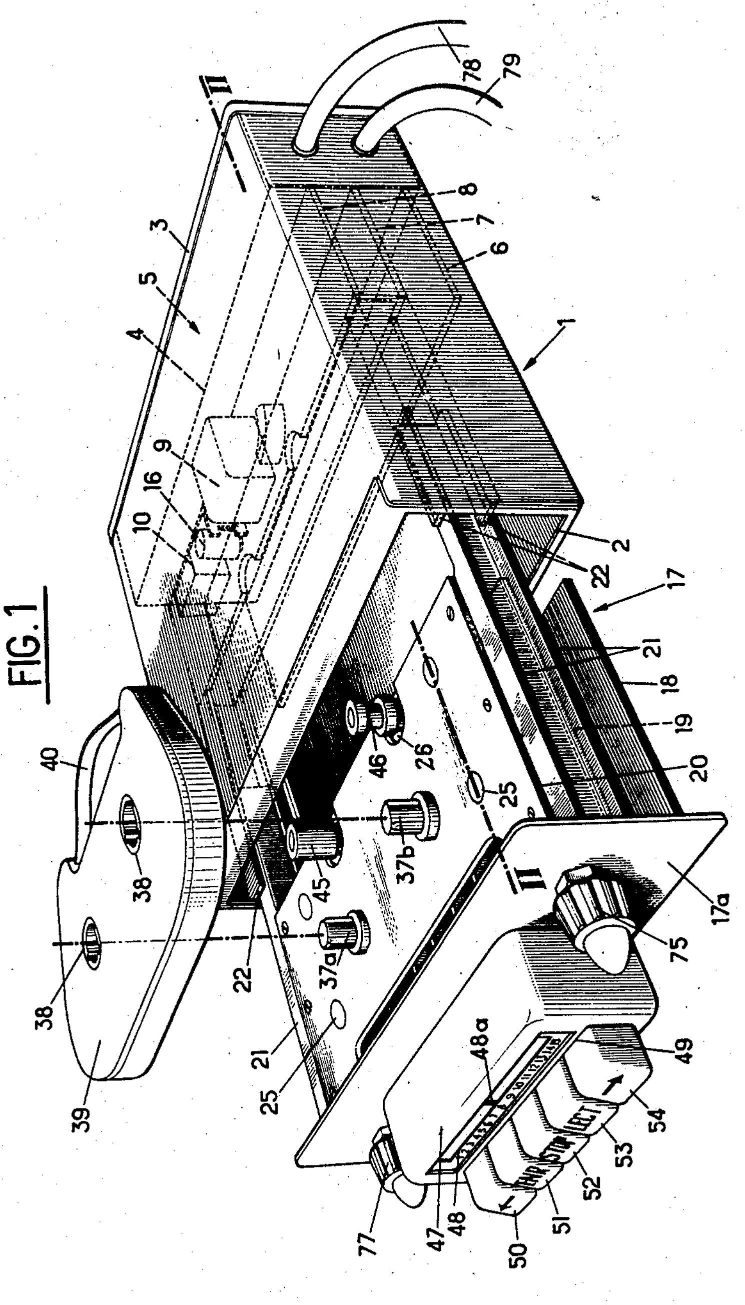
Figure 1 is a perspective view showing the assembly of the apparatus, with its drawer open and its tape-carrying reel removed.

By referring to the drawings it will be seen that the device constituting the present invention consists of a chassis, preferably of metal, and comprising a box 1, the front surface of which is provided with a rectangular opening 2, and the rear end of which is closed by a back 3, preferably fixed, so as to define with a partition 4, a compartment 5 enclosing a switch and all or part of an amplifier, which may be of the transistor type.

Three parallel shelves 6, 7 and 8, suitably spaced each from the other, are mounted in front of the partition 4.

One or more heads 9 for recording, reproducing and erasing are mounted on the shelf 8, together with a device 10 for guiding the tape in a manner which will be hereinafter explained.

A motor 11 (Figures 5 and 11), which turns in a counterclockwise direction, is mounted on the bottom of the box 1. A pulley wheel 12 is mounted on the shaft of this motor and frictionally drives the rubber covered wheel 13, which is mounted on the same shaft as a speed-controlling flywheel 15 and a conventional capstan 16 for driving the tape.

A drawer 17 is slidably mounted in this box and carries 3 shelves 18, 19 and 20 (Figure 1), corresponding to the aforementioned shelves 6, 7 and 8, the shelves 19 and 20 being fixed to the front panel 17*a* of the drawer, which closes the opening 2. The drawer 17 slides on lateral runners 21 which cooperate with runners 22 which are fixed to the inner surfaces of the sides of the box 1.

Figures 2, 3, 4:
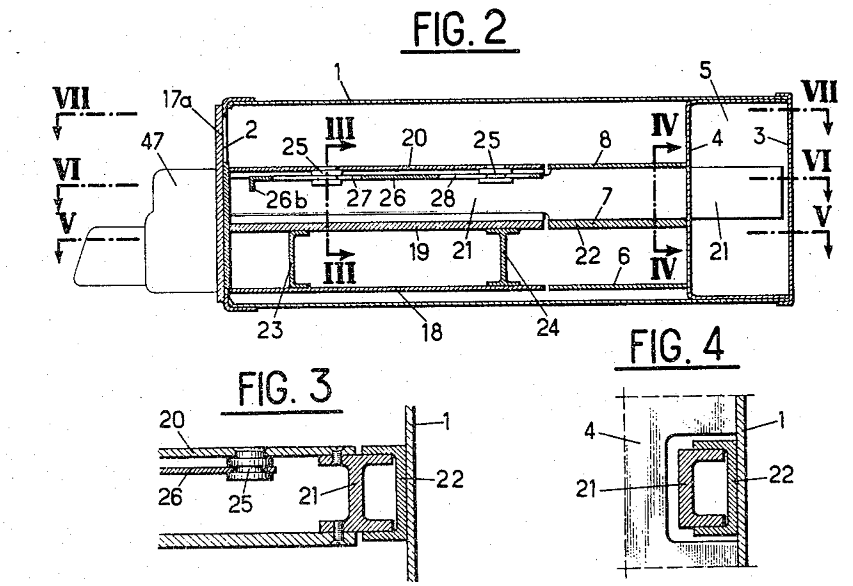
Figure 2 is a cross-sectional view taken along the line II—II of Figure 1, with the drawer of the apparatus closed.
Figure 3 is a cross-sectional view, on an enlarged scale, taken along the line III—III of Figure 2.
Figure 4 is a cross-sectional view, on the same scale as Figure 3, taken along the line IV—IV of Figure 2.
Figure 5:
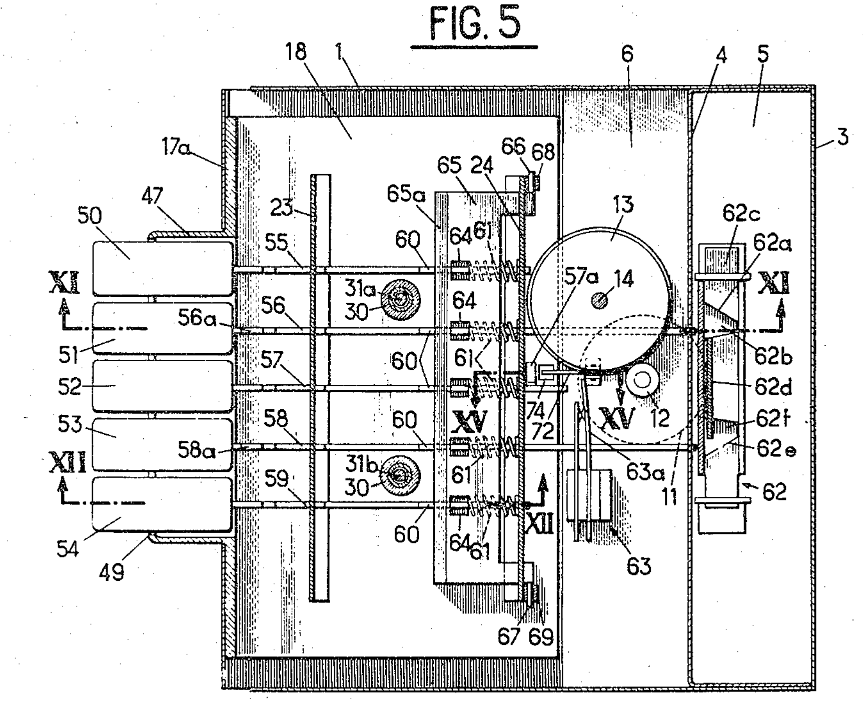
Figure 5 is a cross-sectional view taken along the line V—V of Figure 2.
Figures 6, 7:
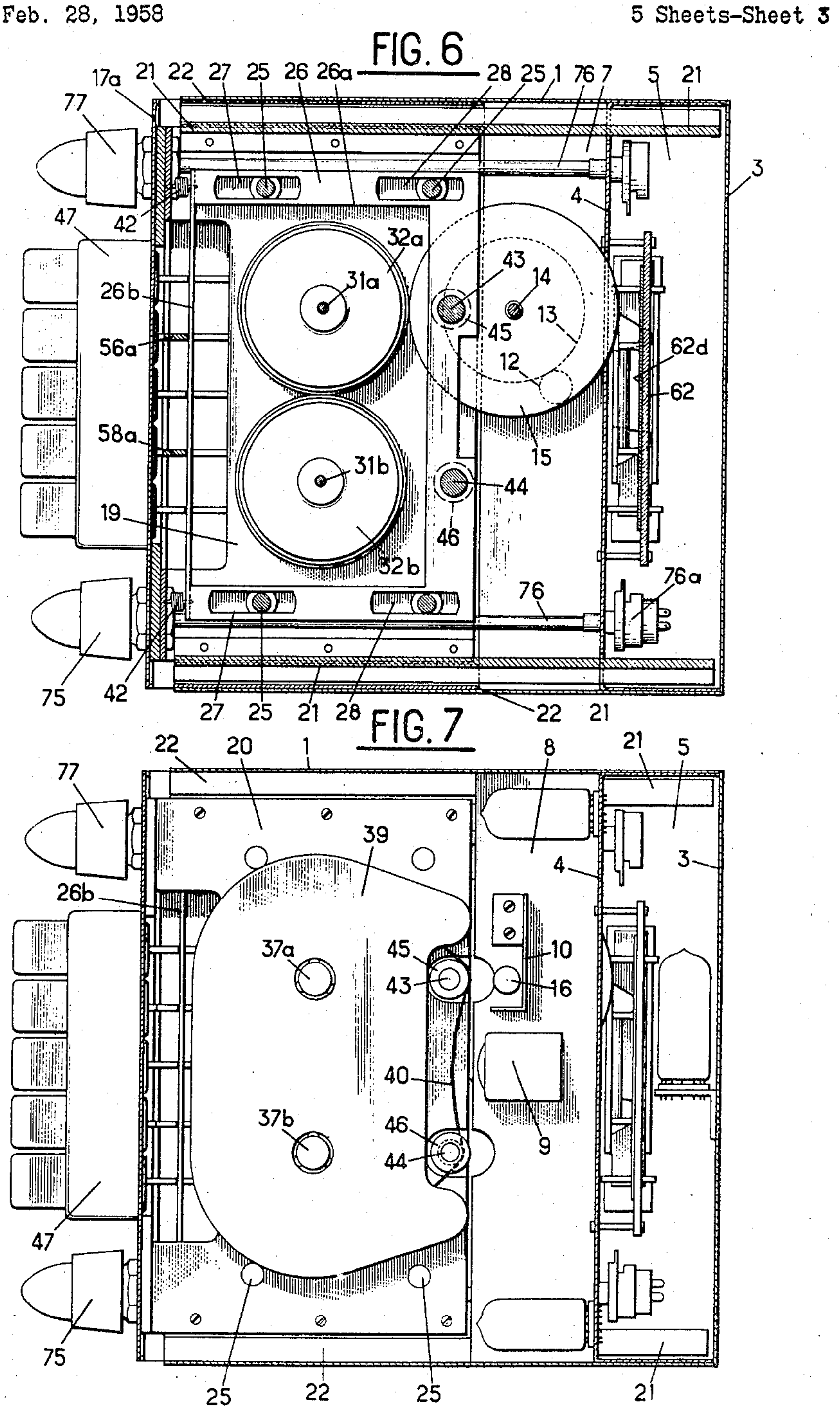
Figure 6 is a cross-sectional view taken along the line VI—VI of Figure 2.
Figure 7 is a cross-sectional view taken along the line VII—VII of Figure 2.

The shelves 18 and 19 are connected by two transverse braces 23 and 24 (Figures 2 and 5). A plate 26 is suspended beneath the shelf 20 by means of locating pins 25. This plate is notched at 26 and provided at 27 and 28 with slots which permit it to be displaced slightly with respect to the locating pins 25 which are fixed to the shelf 20 (Figures 2 and 6).

Figures 11, 12:
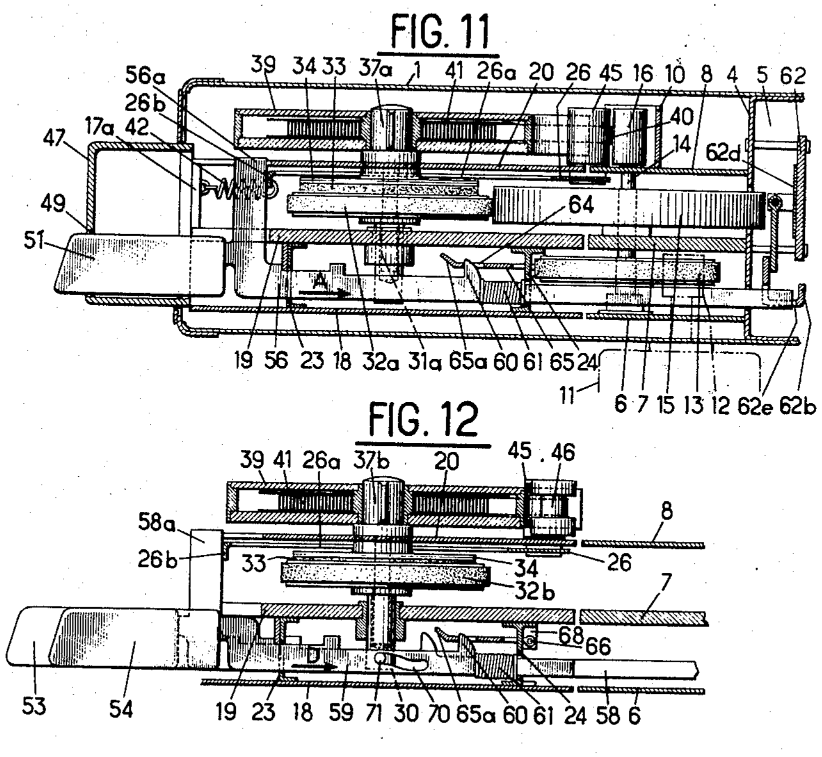
Figure 11 is a cross-sectional view taken along the line XI—XI of Figure 5.
Figure 12 is a cross-sectional view taken along the line XII—XII of Figure 5.

Two holes 19*a* extend through the shelf 19. A bearing 29 is mounted in each of these holes (Figures 13 and 14) and a sleeve 30 turns freely in each bearing. These sleeves 30 receive shafts 31*a* and 31*b* which extend through two wheels 32*a* and 32*b* and two discs 34, between which a felt disc 33 is inserted. The discs 34 are fixed to the shafts 31*a* and 31*b* by means of keys 35. The shafts 31*a*—31*b* turn in bearings 36 mounted in the upper shelf 20 and terminate above this shelf in a knob 37. The two hubs 38 of the reel-holders 39 are adapted to be rigidly mounted on these knobs 37 and carry the tape 40, whether inscribed or blank, which is mounted on two reels 41. The wheel 32*a* is in engagement with the flywheel 15 (Figures 6 and 12).

The notched plate 26 is provided at its front end with a flange 26*b* to which are attached the ends of two contraction springs 42, the opposite ends of which are attached to the plate 17*a* at the front of the drawer.

At its rear end, the notched plate 26 carries two shafts 43 and 44. An idler 45 is mounted on the shaft 43 and cooperates with the capstan 16, while the shaft 44 carries a grooved guide wheel 46. The tape 40 travels in the groove of this guide wheel.

The control means for the machine comprise an outer box 47 fixed to the front panel 17*a* of the drawer and containing a timer 48, the needle of which indicates the duration of recording or reproduction and permits the user to relocate immediately any desired point on the tape (Figure 1).

The box 47 has a window 49 through which a series of push buttons 50, 51, 52, 53 and 54 extend. These correspond respectively to: the rapid forward movement of the tape; recording; stopping, reproduction, and rapid backward movement.

The pushbuttons 50, 51, 52, 53 and 54 respectively carry bars 55, 56, 57, 58 and 59 which pass through the transverse braces 23 and 24 between the shelves 18 and 19. These bars are each provided at their inner ends with a catch 60 (Figure 11) which bears against one end of a spring 61, the other end of which bears on the web portion of the brace 24. The springs 61 hold the aforementioned bars, and the pushbuttons fixed to them, in an outwardly extended position, as shown in Figures 1, 5, 6 and 7.

The bars 56 and 58 of the pushbuttons 51 and 53 which correspond to recording and reproducing, are provided with arms 56*a* and 58*a* (Figure 11) which abut the flange 26*b* of the notched plate 26. These bars extend between the shelves 6 and 7 and pass through the partition 4 of the compartment 5 to end at the sliding switch 62 which changes the machine from recording to reproducing position and vice versa.

The bar 57 of the "stop" button 52 extends beyond the brace 24 and butts against a switch 63, which is adapted to open the circuit supplying the motor 11 so as to stop the machine.

The catches 60 of the bars 55, 56, 57, 58 and 59 cooperate respectively with openings 64 (Figures 5, 11 and 12) in a plate 65 provided with two spindles 66 and 67 which turn in bearings 68 and 69 positioned at the ends of the brace 24.

A window 70 is cut through each of the bars 55 and 59, the edges of which form a ramp for the lug 71 mounted on the sleeve 30 (Figure 12) which has already been described.

Figure 15:
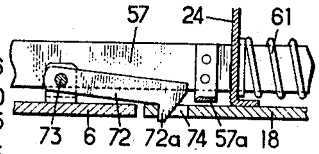
Figures 15 and 16 are cross-sectional detail views, on an enlarged scale, taken along the line XV—XV of Figure 5, showing the means for locking the drawer in the box.
Figure 16:
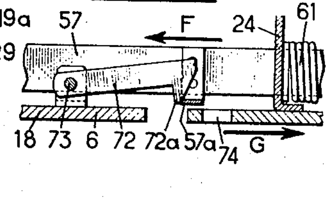

The bar 57 carries a finger 57*a* (Figures 5, 15 and 16) which cooperates with a latch 72 pivotally mounted at 73 on a support fixed to the shelf 6. The end 72*a* of the latch 72 is in the form of a hook, and when the drawer 17 is pushed all the way back into the box 1, this hook automatically engages in an opening 72 near the inner edge of the plate 18, thus locking together the drawer and box.

The entire apparatus is stopped and the tone and volume of the sound regulated by means of control button 75 fixed to a motion transmitting rod 76 which actuates the tone and volume control 76*a*, automatically cutting off the current when turned to the end of its path of travel. The motion transmitting rod 76 is so constructed as to be automatically coupled with or uncoupled from the said control member 76*a* when the drawer 17 is moved in and out (Figure 6).

The speed of rotation of the motor 11 is regulated through the rheostat 77.

Reference numerals 78 and 79 indicate the connections to loudspeaker and microphone respectively.

Figure 8:
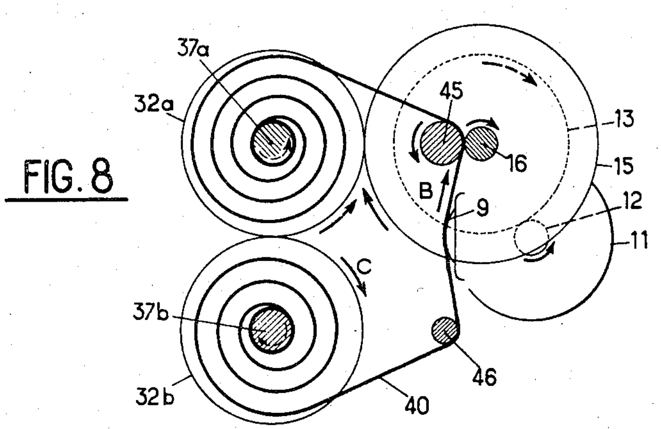
Figure 8 is a schematic view showing the means for driving the tape in the recording or reproducing position.

The reel holders 39 having been put in place and the tape 40 having been positioned against the pressure roller 45 and in the groove of the guide wheel 46, the drawer 17 is pushed into the box 1, where it is locked by the catch 72*a* which becomes engaged in the opening 74. The machine is then ready to be placed in operation. To start it, the button 75 is turned to close the supply circuit to the motor 11 (Figure 8). This motor begins to turn, and drives the rubber coated disc 13 through its pulley wheel 12, and consequently drives the capstan 16 which, as already explained, is mounted on the same shaft.

In order to make a recording (Figure 11), the button 51 is pushed in, thus displacing the bar 56 which is fixed thereto, in the direction indicated by the arrow A, and compressing the spring 61 behind it. The catch 60 then passes under the upwardly bent front edge 65*a* of the plate 65, raises it, and becomes engaged in the corresponding hole 64, thus holding the pushbutton 51 in the "in" position. Simultaneously, the end of the bar 56 comes to bear (Figure 5) against the slanting edge 62*a* of an opening 62*b* in the control bar 62*c* of the sliding switch 62 already described and displaces a small plate 62*d* which closes the circuit to the recording head of the multiple head 9. At the same time the vertical extension 56*a* of the bar 56 comes to bear against flange 26*b* on the notched plate 26 and consequently against the rollers 45 and 46 mounted thereon. The pressure roller 45 presses the tape 40 against the capstan 16 which is in motion (Figure 11).

The tape 40 passes over the rollers 45 and 46 and, guided by the fixed member 10, is brought into contact with the multiple head 9, and then runs off in the direction indicated by the arrow B (Figure 8).

The flywheel 15, fixed to the same shaft 14 as the disc 13 and the capstan 16, drives the disc 32*a* which in turn drives (through the friction clutch consisting of the felt 33 and the disc 34) the shaft 31*a* of the coil 40 mounted on the knob 37*a*, at a speed greater than that of the capstan 16, by reason of the difference between the diameters of the flywheel 15 and the disc 13. This tends to wind the tape onto the reel at a speed greater than that at which it is made available thereto, thus putting it under tension. This is permitted by the slipping of the felt 33 between the disc 32*a* and 34, when the tension becomes too great. On the other hand, the disc 32*a* drives the disc 32*b* in the direction indicated by the arrow C (Figure 8) and consequently in the direction opposite to that in which the tape unwinds. The felt 33 slides frictionally between the disc 32*b* and the disc 34 mounted on the shaft 31*b*, thus braking the tape 40.

The tape may be stopped during or after recording, by pushing in the pushbutton 52 marked "STOP." As it is pushed in, the projection 60 on the bar 57 lifts the plate 65 by acting on its front edge 65*a*. The projection 60 of the bar 56, which was pushed in during recording, is released from its opening 64 and the bar 56 and its button 51 are forced back into their initial positions by the corresponding spring 61, along with the plate 26 and the rollers 45 and 46. The end of the bar 57 pushes against the contact-carrying blade of the switch 63 and stops the motor 11. The projection 60 of the bar 57 is caught in the corresponding hole 64.

When it is desired to reproduce the text recorded on the tape 40, it must first be run backward. This reversal is obtained by pushing in the button 54 which carries an indicating arrow pointed in a direction opposite to that in which the tape normally moves.

Figure 9:
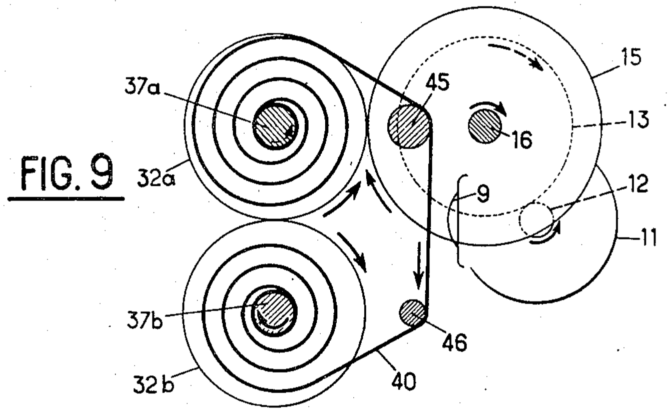
Figure 9 shows the driving means in position to drive the tape rapidly in a reverse direction.

As in the previous case, the bar 56 is unlocked from the plate 65 and returns to its initial position. The switch 63 closes the circuit and the motor 11 starts up. Its motion is transmitted to the shafts 31 in the following order (Figure 9): pulley wheel 12, roller 13, flywheel 15, disc 32*a*, disc 32*b*. The movement of the bar 59 in the direction of the arrow D (Figures 12 and 14), by acting through the ramp 70 on the lug 71, effects the vertical displacement of the sleeve 30, the upper part of which lifts the disc 32*b* (arrow E, Figure 14). This squeezes the felt 33 against the disc 34, thus placing it in driving engagement with the shaft 31*b*, the head 37*b* of which drives the hub 38 of the reel 41 and brings about the rapid reverse movement of the tape 40, thanks to the large diameter of the flywheel of the motor 15.

Figure 13:
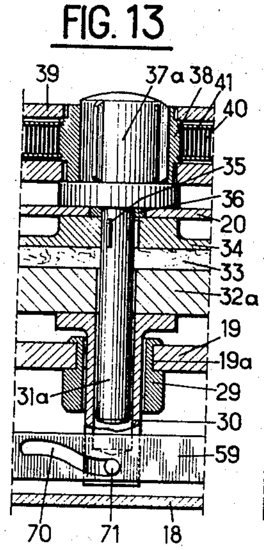
Figures 13 and 14 are cross-sectional views showing the recording shaft in disengaged position and the reproducing shaft in engaged position.
Figure 14:
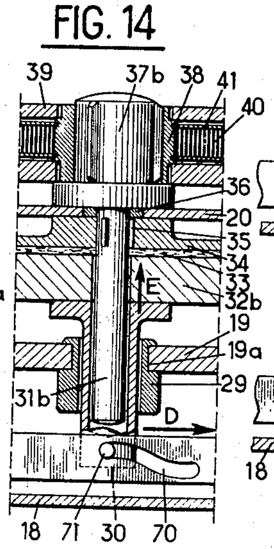

The braking of the unreeling of the tape from the reel 41 mounted on the shaft 31*a*, is obtained in the same manner as during the recording operation: The disc 32*a* turns in the opposite direction to that of the tape, but it remains disconnected from the shaft 31*a* (Figure 13). The tape 40 is reeled back to the point at which recording began.

In order to reproduce the recording, the button 53 marked "LECT" (Figure 5) is pushed in. The catch 60 on the bar 58 lifts the plate 65 which frees the quick reverse button 54, disengaging the disc 32*b* from the shaft 31*b*. Simultaneously the bar 58 is locked by its catch 60 which becomes engaged in the corresponding hole in the plate 65. The end of the bar 58 comes to bear against the ramp 62*e* of the opening 62*f* in the control bar 62*c* of the sliding switch 62, thus displacing the plate 62*d* which closes the circuit to the reproducing head of the multiple head 9.

Since the bar 58 is provided with an arm 58*a* like 56*a* of the bar 56, the same movements which were carried out during recording are repeated. The tape 40 passes over the rollers 45 and 46, and is brought into contact with the playing head; the pressure roller 45 comes into contact with the capstan 16 which turns, and the tape unreels in the same direction and at the same speed as during the recording, thus permitting the recorded text to be played back.

Figure 10:
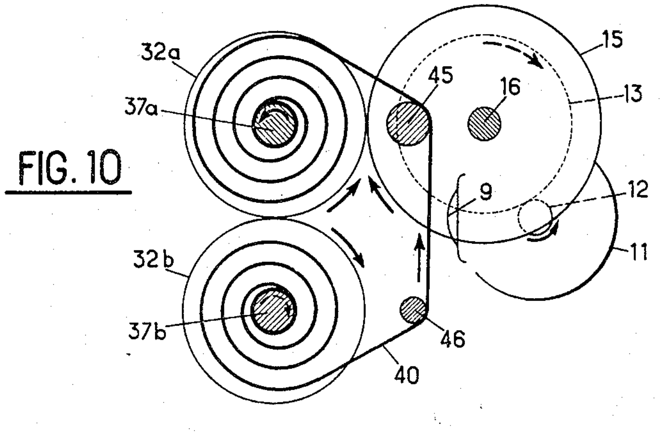
Figure 10 shows the driving means in position to drive the tape rapidly in forward direction.

It may be necessary to run the tape rapidly in its normal forward direction especially to permit the replaying of a specific portion of the recording. This may be accomplished by pushing in the button 50 marked with an arrow pointing in the normal forward direction. The catch 60 corresponding to this button raises the plate 65, frees the button previously pushed in, enters its own hole 64 and locks the button 50. The ramp in the bar 55 (which is like the ramp 70 of the bar 59) drivingly connects the disc 32*a* and the shaft 31*a*. This connection is completed as follows (Figure 10): pulley 12 of motor 11, disc 13, flywheel 15, disc 32*a* engaged to shaft 31*a*, disc 32*b* disengaged from shaft 31*b*.

The tape 40 is thus driven rapidly and wound up on the reel 41 mounted on the knob 37*a* of the driven shaft 31*a*. Its unwinding from the reel 41 mounted on the knob 37*b* of the disengaged shaft 31*b* is slowed by the rotation of the disc 32*b* in the opposite direction.

To completely stop the machine, all of the operating elements must be returned to their initial positions. This is accomplished by pushing one of the buttons 50, 51, 52, 53, 54 part way in. The catch 60 on the bar connected to the button which is pressed raises the plate 65, freeing the bar, without entering into the opening 64. When the pressure on this button is relieved it is immediately forced back by its spring 61 and all the other buttons are simultaneously returned to their initial or rest position (Figure 1). The motor is stopped by turning the button 75.

To change the reel carrier 39, the drawer 17 is withdrawn from the box 1. This may be done by pushing in the button 52 marked STOP and its bar 57 (arrow F, Figure 16). The finger 57*a* on the bar 57 raises the lug 72*a* of the lever 72, releasing it from the opening 74 in the plate 18. At this moment the drawer is pulled in the direction indicated by the arrow G (Figure 16), and slides out of the box on the runners 21 and 22.

When the drawer is reinserted, the rear edge of the plate lifts the lever 72 by means of the lug 72*a* which, when it falls back, becomes locked into the corresponding opening 74.

It will, of course, be appreciated that the scope of the invention is not limited to the specific embodiment herein described, which could be modified as to details without thereby departing from the spirit of the invention.

Thus, for example, the apparatus may be arranged to operate with wires, discs, or the like, as well as with the tapes or films 40 mounted on the reels in the reel carriers herein described.

What I claim is:

1. Apparatus for recording sound on a continuous strip and reproducing it therefrom, said apparatus comprising a box provided with an electric motor, strip driving means driven by said motor, and recording and reproducing head means; a drawer slidably mounted in said box and provided with two rotatable spindles adapted to drive reels carrying said continuous strip, friction clutch means comprising driving and driven members mounted on said drawer for driving said spindles, cooperating means on said drawer and box which connect said motor to drive the driving members of said clutches in opposite directions when said drawer is inserted in said box, means for engaging each of said clutches, means mounted on said box and driven by said motor for driving said strip past said head at a speed slower than that at which said motor drives the driving members of said friction clutches, means for pressing said continuous strip into driving contact with said strip driving means, electrical circuits comprising separate switches controlling the supply of electricity to said head means and to said motor respectively, a plurality of push-buttons positioned at the front of said drawer for controlling the operation of said apparatus, each pushbutton being fixed to the forward end of a slidable control bar which projects backwardly into the apparatus and is biased to a forward position, a restraining plate pivotally mounted on said box transversely of said control rods, and a catch on each control bar adapted to engage cooperating means formed on said restraining plate to retain said bar in a backward position, certain of said control rods being individually formed and positioned to complete the connections required to initiate specific desired operations on the part of the apparatus when said rods are forced back and at least one bar being provided with means for turning said pivoted restraining plate as it moves by said plate; thereby releasing the catches on any control bars which may be engaged therewith.

2. Apparatus as claimed in claim 1 in which said drawer carries a horizontally slidable plate, and a freely rotatable presser roll is mounted on said slidable plate, and at least one of said control bars carries means which displace said slidable plate and the presser roll thereon, so as to press said strip against said strip driving means when said last mentioned control bar is pushed in.

3. Apparatus as claimed in claim 2 in which said last mentioned control bar, when pressed in, closes a switch completing the electric circuit supplying said head means.

4. Apparatus as claimed in claim 1 in which said clutch engaging means comprises means for fully engaging and partially disengaging each of said friction clutches including an additional control bar for each clutch, said bar being provided with means which lifts the driving member of said clutch to force it more tightly into engagement with said driven member, when said additional control bar is pushed in.

5. Apparatus as claimed in claim 4 in which said friction clutches are always at least partially engaged.

6. Apparatus as claimed in claim 1 comprising a single removable reel-carrier in which two reels are pivotally mounted in positions registering with those of said rotatable spindles.

7. Apparatus as claimed in claim 1 in which at least one of said control rods carries means engaging said strip pressing means and means for closing the switch controlling the supply of electricity to said head means when said control rod is in its backward position.

References Cited in the file of this patent

UNITED STATES PATENTS

| | | |
|---|---|---|
| 2,712,448 | Schroter | July 5, 1955 |
| 2,804,508 | Mastling et al. | Aug. 27, 1957 |